United States Patent [19]

Bratland

[11] 3,859,906

[45] Jan. 14, 1975

[54] APPARATUS FOR PROCESSING OF FOODSTUFFS AND THE LIKE, PARTICULARLY MILK PRODUCTS

[76] Inventor: Arthur Bratland, Maudsvei 9, Heie, 3140 Notteroy, Norway

[22] Filed: Nov. 29, 1973

[21] Appl. No.: 420,061

[30] Foreign Application Priority Data
Dec. 5, 1972 Norway.............................. 4451/72

[52] U.S. Cl.................................... 99/460, 259/108
[51] Int. Cl......... A23c 23/00, B01f 5/08, B01f 7/16
[58] Field of Search ............ 99/460, 452, 461, 462, 99/464, 465, 466, 348, 409; 259/107, 108

[56] References Cited
UNITED STATES PATENTS
1,666,285 4/1928 Hackstedde..................... 99/348 UX
3,752,057 8/1973 Groen................................... 99/348

Primary Examiner—Robert L. Bleutge
Assistant Examiner—Arthur O. Henderson
Attorney, Agent, or Firm—Kenyon & Kenyon Reilly Carr & Chapin

[57] ABSTRACT

The apparatus is constructed with a rotor for homogenizing purposes and beaters which are utilized for mixing, stirring and beating. The rotor and beaters are mounted at different points within the assembly and the assembly is pivotally mounted so that one or the other of the rotors or beaters can be utilized with a water cooled container.

4 Claims, 2 Drawing Figures

PATENTED JAN 14 1975 3,859,906

APPARATUS FOR PROCESSING OF FOODSTUFFS AND THE LIKE, PARTICULARLY MILK PRODUCTS

The present invention relates to an apparatus for processing of foodstuffs and the like, particularly milk products, comprising a support means for supporting a foodstuff receiving container and for supporting driving means for the processing of foodstuffs or the like.

An object of the present invention is to provide an apparatus especially suited for the production of regenerated milk products, and which is also suited for further processing of such mlik products, also included processing of other foodstuffs in a manner known per se by means of mixing, stirring or beating devices.

In recent times there has been a constantly growing need for the production of regenerated milk products, particularly in areas where local supplies of fresh milk products are short or non-existent. By regenerated milk products is meant first of all milk products such as ordinary whole milk, fat rich or fat poor cream, and the like, which are produced on the basis of dried milk powder, water and fat, such as vegetable fat, although such applications as the production of ice-cream mix, whipped cream, sauces, etc. have also been considered. In producing regenerated milk products containing fat, it has been usual to employ large capacity machines for use in dairies, hotels. on board ship and the like. An object of the present invention is to provide an apparatus which is intended for the production of smaller quantities of regenerated milk products, for instance for domestic use or for other applications where small quantities are required.

In regenerating milk products it is necessary to break up the fat fraction into fine particles and distribute such particles evenly throughout a liquid fraction of water and dry milk powder by means of a homogenizing unit. The rotating part of the homogenizing unit is required to rotate at high speeds in order to achieve a required degree of breaking-up effect on the fat particles and to achieve an even distribution of same in the liquid fraction, in order to give a consistency corresponding as closely as possible to that of ordinary mlik or cream.

It is an object of the present invention to make it possible to use an ordinary hand mixer or a similar domestic apparatus which is used for mixing, stirring or beating processes in addition as a homogenizing apparatus. Adjustable rates of rotation are required in ordinary mixing, stirring and beating processes, depending on the viscosity of the material to be processed, and to avoid overloading the driving motor it is usual to employ reduced rates of rotation that are relatively moderate as compared with the speed of rotation of the motor. Due to such requirements the usual connections for the mixing, stirring and beating devices are not suited for connecting the rotor of a homogenizing unit therewith, as a considerably greater speed of rotation is necessary in a homogenizing apparatus than that obtainable from ordinary connections in an ordinary hand mixer. Also because of complications involved in assembling and dismantling a usual homogenizing unit, it would not only be necessary to connect the rotor of the homogenizing unit to the connections but also to attach the stationary part of the homogenizing unit to the hand mixer itself, in an effective manner.

A special object of the present invention is to provide a simple solution to this problem, by means of which an ordinary hand mixer or a similar apparatus can be used as a driving unit for the homogenizing unit, without complicating the connection and disconnection of the mixing, stirring and beating devices as required.

The apparatus of the present invention is characterized by a separate means for connecting the rotor of a homogenizing unit with the motor of the apparatus, which means is separate from the connection means of the ordinary mixing, stirring and beating devices, and is making it possible to connect the rotor directly to the driving motor of the apparatus, whereas the operation of the other devices being disengaged, and for disengaging the rotor from said driving motor while the other devices are connected to the driving motor, and a pivotal support by which the driving unit of the apparatus can be pivoted from a first position for the operation of mixing, stirring and beating devices, immersed in the material to be processed in the container, to a second position for the operation of the homogenizing unit, immersed in the material to be processed in the container, which container is provided with an arrangement for exterior heating and cooling of the container and its contents as required.

Further features of the present invention will appear from the following description, with reference to the accompanying drawings, wherein.

Figure 1:
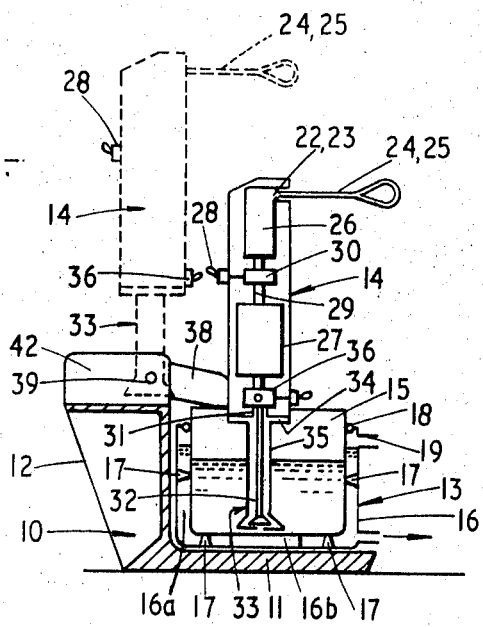
FIG. 1 is a schematical side view, partly a sectional view, of an apparatus of the present invention in a first position for the production of a regenerated milk product by means of a homogenizing unit.
Figure 2:
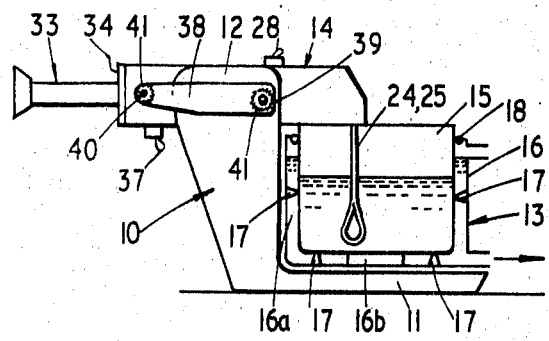
FIG. 2 is a similar side view of the apparatus in another position, for further processing of said regenerated milk product.

In the drawing is illustrated a support means 10 provided with a disc-shaped base 11, with an upwardly inclined bracket 12. Said base 11 is designed to locate a container 13 securely in intended position, preventing it from arbitrary horizontal displacement, whereas said bracket 12 is designed to support a hand mixer 14 or a similar apparatus in the two different positions as shown in FIGS. 1 and 2.

The container is double-walled, consisting of an inner container 15 of heat-conducting material, for instance aluminium, contained in a vertically displaceable manner in another container 16 of non-heat-conducting material, for instance of a suitable plastic material. The outer container is equipped with distance pieces 17 which secure the inner container in position in the outer container suitably spaced therefrom. A sealing ring 18 forms a seal between the top part of the outer container and the inner container, thus forming an intermediate jacket 16a. Water supply pipes 19 and 20 allow circulation of hot and cold water in the jacket 16a. In the drawing is shown a heating element 16b at the bottom of the outer container for the heating of the water in said water jacket. In an alternative embodiment the outer container can be made of heat-conducting material and be designed to rest on a heating element incorporated in the base 11 of the support means 10.

In an especially advantageous embodiment of the invention the container and its contents can be heated and cooled as required, or in succession, by means of a so-called "heatpump," that is a thermo-electric unit based on sintered *p*-and *n*-type semi-conductor thermo-couples which is making use of the Peltier effect. Heat pumps of this type are marketed by the firm Salford Electrical Instruments Limited, Manchester, England. Such heat pumps are provided with a heat block side and a cold block side, heat being "pumped" from one side to the other, from which it is withdrawn for cooling of the contents of the container, by means of cooling water, cooling air or another medium. For heating of the contents of the container heat must correspondingly be withdrawn from a supplied source of heat, such as hot water, hot air, or the like. The heat pump can, if necessary, be placed in the space between the outer container 16 and the inner container 15. The heat pump can, if desired, be combined with an ordinary heating element, the heating element being used during the heating operation and the heat pump only during the cooling operation.

One end of the hand mixer is equipped in the usual manner with two parallel connection devices 22, 23, for the connection of mixing devices 24, 25, a stirring device or beating device. Mixing devices 24, 25 can be replaced by beating devices or a simple stirring device in the usual manner, which is not shown. Such devices are operated via a gear means 26 from a driving motor 27. The gear means regulates the operating speed of the devices by means of a lever 28. Stopping and starting of the motor 27 and the engaging and disengaging of the gear means 26 in relation to the drive shaft 29 of the motor 27 take place by means of a combined connection and switch unit 30 which is operated by a lever 28.

The hand mixer 14 is equipped, at the opposite end of the connecting devices 22, 23 with a separate connection device 31 for the rotor 32 of a homogenizing unit 33, with a corresponding attachment device 34 for the stator 35 of the homogenizing unit. The rotor 32 is connected to the shaft 29 of the driving motor 27 via a combined connection and switch unit 36 of a type corresponding to the unit 30. The unit 36 is operated by a lever 37.

The hand mixer is attached to the bracket 12 via two articulated arms 38 of which the one end is pivoted at 39 to the bracket 12, the opposite end being pivoted at 40 to the hand mixer, whereas spider stop screws 41 being designed to maintain the hand mixer in desired position in relation to articulated arms 38. The articulated arms 38 permit the hand mixer to be pivoted from the position shown in FIG. 1 to that shown in FIG. 2, and vice versa. An opening 42 in the bracket 12 permits the hand mixer — with the homogenizing unit in position — to be pivoted between the above-mentioned positions in FIGS. 1 and 2 via an intermediate position illustrated by the broken lines in FIG. 1.

The following is a description of an application of the invention in the production of regenerated cream to be further processed into whipped cream.

One part skim milk powder and one part butter milk powder is placed in the container 15, and a sufficient amount of water of a temperature of approx. 40°C is added to give a mixture with a solids-non-fat content of approx. 8 per cent by weight. Water of a temperature of about 40°C is then allowed to circulate in the water jacket 16a of the container, and an initial stirring of the mixture is made by means of a stirring device fixed to one of the connection devices 22, 23 of the hand mixer. After a suitable period of time the hand mixer is pivoted via the articulated arms 38 from the position shown in FIG. 2 to the position shown in FIG. 1, so that the homogenizing unit is immersed in the mixture, ready for further processing of said mixture. Before the homogenizing unit is switched on fat is added in the form of soya oil, in a quantity sufficient to increase the fat content of the mixture to approx. 25 per cent by weight. While the homogenizing process takes place the temperature of the water in the jacket is increased to a temperature just below the boiling point, in order to pasteurize the mixture in the container 16. Thereupon the water in the water jacket 16a is replaced by circulating cold water, while the final phase of the homogenizing process takes place, the homogenized whippable cream product being thus simultaneously cooled in an effective manner.

Suitable sweetening agents and flavour additives are then added to the mixture, and the hand mixer is pivoted from the position shown in FIG. 1 to that shown in FIG. 2, with the beating devices 24, 25 in position. The cream product is then whipped in usual manner.

A major advantage of the apparatus according to the invention is that it provides a domestic appliance that can be employed for ordinary mixing, stirring and beating processes using conventional hand mixer devices, and can in addition be employed for homogenizing purposes without complicating the above-mentioned processes. It is thus a major advantage of the invention that the homogenizing unit can be maintained in inactive position but ready for use, while one of the conventional hand mixer devices is being employed, and that only one simple movement is necessary to alternate between the homogenizing unit and the other devices, as desired. The apparatus is especially suitable for the processing of a material in different steps in succession, with no loss of time, using first the conventional hand mixer devices, then the homogenizing unit, and, if further processing is necessary, then the conventional hand mixer devices again. Although the description given of the apparatus applies especially to the production of whipped cream from regenerated cream, it is obvious that the apparatus can also be used for similar processes for other foodstuffs, or other products.

What I claim is:

1. An apparatus for processing of foodstuffs and the like, particularly milk products, comprising a support means for supporting a foodstuff receiving container (15) and for supporting driving means (14) for the processing of foodstuffs or the like, characterized by a separate means (31) for connecting the rotor (32) of a homogenizing unit (33) with the motor of the apparatus, which means is separate from the connection means (22, 23) of the ordinary mixing, stirring and beating devices (24, 25), and is making it possible to connect the rotor (32) directly to the driving motor (27) of the apparatus, whereas the operation of the other devices being disengaged, and for disengaging the rotor from said driving motor while the other devices are connected to the driving motor, and a pivotal support (38) by which the driving unit (14) of the apparatus can be pivoted from a first position for the operation of mixing, stirring and beating devices (24, 25), immersed in the material to be processed in the container (15), to a second position for the operation of the homogenizing unit (33), immersed in the material to be processed in the container, which container (15) is provided with an arrangement for exterior heating and cooling of the container and its contents as required.

2. An apparatus according to claim 1, characterized in that the support means (38) is designed for the pivoting of the driving unit (14) of the apparatus with the homogenizing unit in operative engagement therewith from a position for the operation of the homogenizing unit (33) to a position for the operation of other devices, and vice versa, while the container (15) is retained in position in relation to the apparatus.

3. An apparatus according to claim 1, characterized by the container being equipped with a water jacket (16a) for the reception, respectively circulation, of hot or cold medium such as water and, if required, for separate heating of the water in said water jacket (16a).

4. An apparatus according to claims 1, characterized by the container being connected to a heat pump based on the Peltier effect for the cooling and/or heating of the content of the container as required, possibly in combination with an electric heating element.

* * * * *